United States Patent Office 3,220,852
Patented Nov. 30, 1965

3,220,852
PROCESS FOR PRODUCING AN EXPANDED
FOODSTUFF AND AN INTERMEDIATE
THEREFOR
Dirk R. d'Arnaud Gerkens, Jachthuis Liesbosch, Breda, Netherlands, assignor to Nibbit Products Association Ltd., Zurich, Switzerland, a corporation of Switzerland
No Drawing. Filed Feb. 4, 1963, Ser. No. 256,091
10 Claims. (Cl. 99—100)

This application is a continuation-in-part of my copending application Serial No. 829,236 filed July 24, 1959, now Patent No. 3,076,711.

This invention relates to a fried crispy food product in an expanded or puffed state, having a low fat content. The said food product is derived from starch-containing flour and preferably from potato flour. The invention also relates to the unexpanded and unfried intermediate material having excellent shipping and storage properties and being distinguished by a hard outer layer having uneven protuberances and both a critical salt and moisture content.

A number of crispy food products have been developed to take the place of potato chips as snack foods. These products are preferred from the viewpoint of taste. However, they suffer the drawback of a high fat content. The usual fat content of fat-fried foods, such as potato chips, is about 40%. Foods containing this amount of fat require careful storage and the use of anti-oxidants to avoid having the product turn rancid upon contact with the atmosphere. In addition, this large amount of fat is a detriment in that it contributes a large amount of calories and diet-conscious people tend to avoid the use of such high-calorie containing materials.

United States Patent No. 2,863,770 describes a food product derived from edible tubers, such as potatoes, which is extruded under pressure and fried to give a crisp expanded product having the taste and aroma of a fried potato product, such as potato chips. This product, however, has a higher weight to volume ratio than desirable and has uncertain frying characteristics and ununiformity in the final product. The present invention represents an improvement over this product and process.

An object of my invention is to produce a fat-fried crisp foodstuff derived from starch-containing flour, preferably, but not necessarily, potato flour, and having a low specific gravity, less than 0.20 as the quotient of weight to volume, and from 3 to 6%, preferably 4 to 5% of the dry weight of water-soluble salt content.

Another object of my invention is an intermediate product ready for frying (hereinafter sometimes called "fryready" material) derived from starch-containing flour and containing a mixture of free starch and combined starch, of the order of about 10% to about 30% free starch in graduated amounts increasing from the center outwardly, preferably 4 to 5% of salt and 6.5 to 10% moisture (preferably 8 to 9.5%), the product having a horn-like, hard dry outer layer with uneven protuberances. By free starch I mean starch freed from the starch cells of the potato and by combined starch I mean starch still surrounded by the original cell walls.

Another object of my invention is a process for the production of a fat-fried crisp foodstuff derived from starch-containing flour and having a low fat content per unit of volume as compared with other fat-fried foods.

These and other objects of my invention will become more apparent as this description proceeds.

I have found that fat-fried, crisp food products having an unexpectedly low specific weight and having a very crisp structure and a fat content of less than 25%, preferably 20 to 22%, can be obtained by frying in hot oil an intermediate product derived from starch-containing flour as described herein. This intermediate product contains critical amounts of salt and water. When this intermediate or "fryready" product containing critical amounts of salt and water is fried in hot oil, the product expands greatly and at the same time, due to the critical moisture and salt content, little oil penetrates into the interior. It is believed that to effect this advantageous result, the salt content of the intermediate product must be sufficiently high so that crystallization of salt crystals on the surface occurs in the outer layer of the dried intermediate product. This crystallization is greatly increased when the intermediate product is immersed in the hot oil, which may give rise to boiling nuclei and may aid moisture transfer out of the product and the heat transfer into the product.

At the same time the moisture imprisoned in the interior of the intermediate product is rapidly heated and driven out, creating rapid expansion of the starchy material and aiding in the prevention of fat penetration into the interior. The product is fried for short periods of time in the nature of 6 to 10 seconds and is removed from the fat and drained before the fat can penetrate into the pores of the expanded product.

The rapid driving of the moisture out of the interior as well as from the surface of the intermediate product may be promoted by the almost instantaneous formation of salt crystals throughout the product when inserted in the hot fat. The rapid expansion or "popping" of the moisture out of the intermediate product produces a low weight to bulk ratio in the finished product which makes it more filling with less weight and calorie consumption and the fact that the rapid escape of moisture reduces the penetration of oil into the finished product leads to a crisp, tasty product having a low weight-to-volume ratio and low fat content as compared with other fried foods, such as potato chips.

I have found that the moisture content and the salt content of the intermediate material derived from starch-containing flour must be very closely controlled to obtain a product which will undergo the above described reactions upon frying in hot oil. The salt in the ratio of 3½ to 6%, preferably 4 to 5%, based on the "fry-ready" product having a moisture content of about 8 to 10% appears to lower the viscosity of the mix in the extrusion or rolling process used to produce the intermediate product and to promote greater expansion of the product both after extrusion and in the final fried state.

While other starch-containing flour can be used in my process, it is preferable to use a flour derived from edible tubers and having present all of the flavor characteristics of the edible tuber, such as the albumen, minerals, fibrous material and flavor characteristics of, for example, the potato. Dried potato flour is an excellent source of starch-containing flour because of its taste appeal.

The intermediate product is believed to contain from about 10 to about 30% free starch in graduated amounts increasing from the center to the outside surface with the remainder of the starch still contained within unbroken cell walls. It preferably contains from about 17% to about 7% moisture in graduated amounts decreasing from the center to the outside surface with an average moisture content of about 8 to 10%. When sodium chloride is used, there should be present a sufficient concentration of it, so that the salt and moisture is in such a balance on the outer surface of the intermediate product that some salt crystals have formed on the dried outer surface of the intermediate product, and in the inside of the intermediate product, the salt is at the point of crystallization. This requires a salt content of between 3½ to 6%, preferably 4 to 5%, in the intermediate product (moist weight). Other uni-univalent salts may be used provided they meet the required conditions of adaptability to a food product. The intermediate material described, is fried in hot oil at from 180° to 210° C. for approximately 6 to 10 seconds and is removed from the oil at the moment when it floats to the surface.

The salt content, the free starch content, the moisture content and distribution in the intermediate product are highly critical. When the extruded or multi-layered moist starch-containing flour product having a higher free starch content on the outer surface is dried, a horn-like outer layer is produced. This layer resists penetration of moisture and of heat and therefore must be quite thin. If it is thick, moisture will be trapped within the product and the product will take too long to fry to a crisp condition, allowing time for fat penetration and burning of the outer layer of the fried product.

If the salt content is sodium chloride and within the critical limits of 3½ to 6%, preferably 4 to 5%, based on the "fry-ready" product having a moisture content of about 10% and the moisture content is distributed so that the center of the dried intermediate product contains about 17% and the outside surface contains about 7% of water, the salt on the surface of the intermediate or "fry-ready" product will have partially crystallized in the drying of the intermediate product and the remainder is at the point of crystallization and when the dried intermediate product is dropped into the hot fat the salt crystals become boiling nuclei and as more salt is crystallized in the interior the number of boiling nuclei becomes greater. These nuclei are equally spread over the surface of the material and extend into the interior of the horn-like dried intermediate product and are believed to aid in the transfer of heat into the material and the transfer of moisture out of the material. The horn-like outer layer of the material acts at the same time as a fat-impervious layer so that heat may be transferred into the interior of the intermediate product and moisture is transferred out of the interior of the intermediate product while hot fat is substantially excluded from the interior of the cooking product. When the sodium chloride content is below the point of crystallization, the heat transfer is slower and the fried product requires longer to cook and does not expand as much.

It can thus be seen that the product produced by frying an intermediate product with these critical ranges of moisture, salt and free starch content is new and distinct from prior art products produced in other manners in that the product has a very low specific gravity, less than 0.20 on a weight-to-volume basis, and at the same time a fat content of less than 25% and ordinarily from 18 to 23%.

The intermediate product is produced from a powdery mixture of starch-containing ground potato flour and water in which the required amount of salt is dissolved. The moisture content of the ground potato flour is preferably about 10% and water is added so that the mixed flour powder as fed to the extrusion machine is moist to the touch and of such consistency that when squeezed in the hand it will retain the shape it is given by the hand. During the extrusion under high pressure and the increase in temperature produced by the extrusion it is believed that the outer layers of starch cells are broken down to provide a layer of free starch on the outer surface of the extruded strands. When such a material having a greater free starch content on the outside is prepared by making several batches of dough, each having a different free starch content, and forming layers of the dough, this is more difficult and time consuming but requires less expensive equipment than the extruded strands. I have found that an intermediate product prepared from starch-containing flour and having a graduated free starch content from the center to the outside is readily and simply prepared by the process of extruding the ground potato flour containing from 28 to 35% of total moisture and from 4 to 6% of added salt on fry-ready material, under pressure, through a small opening, it may also be prepared from multiple layers of dough having different percentages of free starch therein. The mechanical force required to extrude this powder through the small opening is sufficient to reduce it to a plastic condition and is believed to produce a certain amount of a breakdown of flour particles adjacent to the die surfaces of the extrusion press causing the starch within the particles to be liberated. The free starch layers may, however, be formed by grinding and mixing the ground material into multiple layers of dough, each having the desired starch content. The extruded or rolled dough product is almost completely homogeneous with respect to moisture content, whereas small lumps may exist in the unextruded powder. This product as extruded or as a rolled dough layer contains 27.5 to 35% moisture on a total weight basis and when slowly dried at room temperature or towards the end of the drying period at temperatures slightly elevated above room temperature, forms an intermediate product having the required characteristics of critical salt content, moisture distribution, free starch distribution, and horn-like outside layer required to produce the final fried food product.

The intermediate product, when produced by either extrusion or as multilayers of dough can be readily tested for free starch distribution and moisture distribution by grinding the dried intermediate material to a uniform mesh and suspending it in a high density liquid in which all of the material floats on the surface. Graduated amounts of a low density compatible liquid are introduced and after each addition the percentage of the granules which sink, are separated. After all of the granules have sunk it is possible, knowing the average moisture content of the intermediate product, to determine the distribution of moisture from the center to the outer surface since the heavier granules contain less moisture than the lighter granules. At the same time each batch of granules which sinks is separately collected and the free starch content of the batch is determined. The distribution of the free starch can also be determined since the heavier granules contain the least water and are those from the exterior of the intermediate product whereas the lighter granules contain the most water and are from the interior.

The intermediate product when dried can be fried immediately or it can be stored for long periods of time before frying. Since the horn-like outer layer retards changes in the moisture content by evaporation or condensation, this product can be shipped in commerce and fried near the point of consumption and utilized in areas where importation of fat-fried products is not allowed, taking care that at the moment of frying the average water content is between 6 and 10% and the outer layer contains less than 85% of the moisture content of the inner layers. In making the intermediate product, seasoning materials such as cheese powders, tomato powder, curry powder, etc., may also be added.

While antioxidants are not necessary due to the low fat content of the final product, they may be included to further aid in the shelf life of the product. Any antioxidant suitable for use in connection with fat-fried foods can be used, such as soya flour, butylated hydroxytoluene (B.H.T.), butylated hydroxyanisole (B.H.A.), propyl gallate, organic acid gallates, etc., and mixtures thereof.

The following examples are illustrative of the invention. They are exemplary only and are not to be construed as limiting the invention. Modifications and changes in these examples will be readily apparent to one skilled in the art.

*Example I*

A dried potato flour prepared so that it has approximately 10% free starch content is added to water containing sodium chloride in such a ratio that the water content is between 28 and 35% and the salt content is between 4 and 6%, preferably 4.2 to 4.6% of the weight of the potato flour. The dried potato flour may be prepared by blanching potatoes to a negative peroxydase test, drying and grinding to give a flour which passes through a 40 mesh sieve with at least 70% passing through a 50 mesh sieve and at least 50% passing through a 70 mesh sieve. The grinding releases some of the startch as free starch and when the proper grind is made as indicated, about 10% of the starch is believed to be in the free state capable of being dissolved in cold water. The mixture of water, salt and potato flour is kneaded in a mixer to obtain as uniform a loose powdery mass as is possible. The powdery mixture is then fed into an extrusion press and is extruded through orifices at a speed of approximately one centimeter per second using orifices of 1 x 3.2 mm. The strands leaving the orifices are elastic and expand to a cross section of about 8 to 10 mm.$^2$. They have a free starch content of about 30% adjacent the outer surface where the starch granules have been broken adjacent the die, at the high extrusion pressure. The strands in this condition are somewhat elastic, like rubber. When slightly stretched they will tend to return to their original length and they can be stretched to about 120% of their length before rupturing. These strands are dried at room temperature to reduce the moisture content as low as practical and towards the end of the drying period the temperature of the air is raised to about 40° C. The water content of the dried intermediate material is reduced to an average of about 9%, the inner layers containing a higher amount and the outer layers containing a lower amount than that specified. The range of moisture distribution varies from about 17% in the center of the intermediate material to about 7% on the surface of the intermediate material. The product in the form of the long strands is broken into convenient pieces and dropped into hot fat maintained at about 180 to 210° C. The amount of salt with reference to the moisture content is preferably just at the critical point of crystallization so that salt crystals form on the surface of the intermediate product and immediately after the intermediate product is dropped into the hot oil, more crystals form, which salt crystals are believed to provide boiling nuclei promoting the penetration of heat into the interior of the product and the escape of moisture therefrom. The pieces sink in the hot oil, expand rapidly and after 8 to 10 seconds rise to the surface at which time they are skimmed from the fat and drained.

*Example II*

21 kilograms of dried potato flour containing about 10% free starch and having a range of grain size as follows: all of the material minus 40 mesh, at least 70% minus 50 mesh, and at least 50% minus 70 mesh, and a water content of about 9.1%, is thoroughly mixed with 6 kilograms of water containing 1.180 kilograms of pure sodium chloride (equal to about 5%). To the mass is added 0.21 kilogram of curry powder. The mass is thoroughly mixed into a loose moist powder and passed through an extrusion press having orifices of 3 x ½ mm. at a high pressure producing strands having a breadth of about 5 mm. and a thickness of about 2 mm. and an average moisture content of about 27%. The strands are placed in trays in a room having a circulating air supply and dried for about 6 hours at room temperature. Thereafter for 2 hours the air temperature is raised to 40° C. The dried strands contain about 9% moisture with the greater amount towards the center and lesser amount near the surface, and can be stored at this point for periods of several years. If the strands have picked up moisture during storage the strands should be re-dried to a moisture content of about 9% with the range of moisture distribution from about 17% at the center of the strands to about 7% near the surface of the strands, just before frying. The strands are fried in hot oil at closely maintained temperatures of about 200° C. for 7 to 9 seconds, removed from the oil and drained. The resulting product is expanded to a breadth of about 11 mm. and a thickness of about 3.5 mm., which represents about a fourfold increase in cross section over the cross section of the intermediate product. It has a yellow to gold color, a fat content of about 20%, a moisture content of 3%, a weight to volume ratio of 0.18 and a salt content of 4.8%. The product remains crisp and non-rancid, even after long exposure to the atmosphere.

*Example III*

The process of Example II was repeated omitting the curry powder and utilizing respectively
(1) No added salt
(2) 0.225 kilogram of salt (equal to about 1%)
(3) 0.450 kilogram of salt (equal to about 2%)
(4) 0.920 kilogram of salt (equal to about 4%)
(5) 1.180 kilograms of salt (equal to about 5%) as in Example II above, and
(6) 1.440 kilograms of salt (equal to about 6%)
(7) 1.70 kilograms of salt (equal to about 7%)
(8) 1.95 kilograms of salt (equal to about 8%)
to produce samples numbered 1 to 6 respectively for a comparison. Samples 2 and 3 represent the customary amount of salt added for purposes of seasoning, namely, about 1 to 2% on a dry weight basis. Comparison of the extruded and dried test samples showed the following results:

In the extrusion press the samples with the higher salt content Samples 4 and 5, had a lower viscosity than Sample 1, 2 and 3 and under exactly similar pressing conditions the same press extruded 11 to 25% more of the material of Samples 4 and 5 than of the material of Samples 1, 2 and 3. The higher salt content lowers the pressing viscosity and increases the transparency to the extruded strands.

TABLE 1.—ANALYSIS OF INTERMEDIATE AND FINAL PRODUCT FOR NaCl AND H₂O

| Sample | Raw, Fry-ready Product | | | Fried Product | |
|---|---|---|---|---|---|
| | Salt added, percent | Percent NaCl | Percent H$_2$O | Percent NaCl | Percent H$_2$O |
| 1 | None | 0.24 | 8.40 | 0.14 | 4.50 |
| 2 | 1 | 1.04 | 9.50 | 0.78 | 4.40 |
| 3 | 2 | 2.12 | 9.45 | 1.80 | 4.25 |
| 4 | 4 | 3.82 | 9.95 | 2.94 | 4.05 |
| 5 | 5 | 4.60 | 9.00 | 4.35 | 4.05 |
| 6 | 6 | 5.98 | 9.95 | 5.50 | 4.75 |
| 7 | 7 | 6.70 | 9.75 | 6.30 | 4.30 |
| 8 | 8 | 8.00 | 10.30 | 7.70 | 4.95 |

It is to be noted that Samples 4 and 5 contain less moisture in the final product than Samples 1, 2, 3 and 6, and that the percent NaCl in the final fried product is lower than in the fry-ready product because of the absorption of some fat in the frying operation.

The extruded strands, dried as described in Example II, were measured in exact lengths and weighed. The following is the mean results of a four-fold measurement and weighing of each sample.

TABLE 2

| Sample | Fry-Ready Material, Percent | Mean Weight Per Meter, grams |
|---|---|---|
| 1 | No salt | 7.80 |
| 2 | 1 | 8.71 |
| 3 | 2 | 9.40 |
| 4 | 4 | 9.49 |
| 5 | 5 | 10.48 |
| 6 | 6 | 10.70 |
| 7 | 7 | 11.25 |
| 8 | 8 | 10.44 |

The cross section of the extruded strands was measured at the point of emergence from the extrusion orifices and the percentage expansion over the size of the orifice was found to be as follows:

TABLE 3

| Sample | Fry-Ready Material, Percent | Expansion, Percent |
|---|---|---|
| 1 | No salt | 114 |
| 2 | 1 | 135 |
| 3 | 2 | 157 |
| 4 | 4 | 155 |
| 5 | 5 | 180 |
| 6 | 6 | 191 |
| 7 | 7 | 206 |
| 8 | 8 | 188 |

It is to be noted that Sample 7 has the greatest percentage expansion and that with an 8% salt content (Sample 8) the expansion begins to drop off.

Comparison of the relative amounts of water and salt in the first six samples shows that even in the dried fry-ready strands all the salt in the lower salt samples is in solution, whereas in the higher salt samples part of the salt is in the form of crystals.

TABLE 4

| Sample | Fry-Ready Material, Percent | Percent H$_2$O | Percent NaCl | H$_2$O for sat. sol., percent | | H$_2$O Reserve, Percent | Salt Crystals, Percent |
|---|---|---|---|---|---|---|---|
| | | | | 20° | 90° | | |
| 1 | No salt | 8.40 | 0.24 | 0.7 | 0.6 | 7.7 | |
| 2 | 1 | 9.50 | 1.04 | 2.9 | 2.7 | 6.6 | |
| 3 | 2 | 9.45 | 2.12 | 5.9 | 5.4 | 3.6 | |
| 4 | 4 | 9.95 | 3.82 | 10.6 | 9.8 | | 0.24 |
| 5 | 5 | 9.00 | 4.60 | 12.8 | 11.8 | | 1.36 |
| 6 | 6 | 9.20 | 5.91 | 16.4 | 15.2 | | 2.60 |

The intermediate material was cooked in hot oil at about 200° C. for about 6 to 11 seconds, removed from the hot oil and allowed to drain. The density of the fried product as determined by the quotient of weight to volume was determined and the ratio of total volume to unexpanded material volume was found to be as follows:

TABLE 5

| Sample | Fry-Ready Material, Percent | Density of Fried Material, Two Samples | | Mean | Ratio of Total Volume of Mat. Volume |
|---|---|---|---|---|---|
| 1 | No salt | 0.3080 | 0.3050 | 0.307 | 4.28 |
| 2 | 1 | 0.2210 | 0.2268 | 0.224 | 5.92 |
| 3 | 2 | 0.2046 | 0.2040 | 0.204 | 6.13 |
| 4 | 4 | 0.1876 | 0.1844 | 0.186 | 6.81 |
| 5 | 5 | 0.1866 | 0.1820 | 0.184 | 7.17 |
| 6 | 6 | 0.2080 | 0.2020 | 0.205 | 6.70 |
| 7 | 7 | 0.2340 | 0.2460 | 0.240 | 5.82 |
| 8 | 8 | 0.2790 | 0.2810 | 0.280 | 5.07 |

It is to be noted that Samples 4 and 5 have the lowest density and the highest volume expansion and that above 5% of salt content the density again begins to increase and the volume to decrease; also that the product produced by the use of 4 to 5% of salt has a density of less than 0.20, whereas the product produced according to the example of United States Patent No. 2,863,770 and having a density of 0.22 corresponds to the 1% salt product of Sample 2 in the above tables.

*Example IV*

Three batches of dried potato flour were prepared as follows: fresh potatoes were blanched to a negative peroxydase test, the blanched potatoes were dried under vacuum to a moisture content of about 11% and were ground. The grinding time and the particle size were adjusted so that one batch of potato flour contained 10% free starch, another batch contained 20% free starch, and a third batch contained 30% free starch. The three batches of flour were individually mixed with water and salt in the same proportions as in Example I to form a dough, and rolled or otherwise formed into layers and a sandwich arrangement of the dough layers was prepared. The first layer contained dough prepared from the 30% free starch flour. The second layer contained the dough prepared from the 20% free starch flour. The middle layer contained the dough prepared from the 10% free starch flour. The fourth layer contained the dough prepared from the 20% free starch flour and the fifth layer contained the dough prepared from the 30% free starch flour. The four outer layers were each about ½ of a mm. thick. The inner layer was about 1 mm. thick. The entire sandwich was approximately 3 mm. thick. This sandwich was cut into strands about 6 to 8 mm. wide and dried to a total water content of 9 to 11% with more moisture in the center and less moisture at the outer surfaces of the strands to produce a material similar to the "fry-ready" material of the preceding examples. The strands were fried in hot oil and the product produced resembled that produced in Example I.

While a critical salt content of 3 to 6%, preferably 4½ to 5%, on a dry basis has been specified for the production of the improved product of this invention the critical amount of salt to be used can be determined as follows: Pure sodium chloride is soluble in water to the extent of 35.7 to 39.8 parts in 100 parts of water in the temperature range of from 0° to 100° C. When the salt concentration exceeds this amount, salt crystals begin to form in the solution. By using 4 to 4.5% of sodium chloride in the original composition containing the potato flour having a free starch content of 30 to 35% of water, all the salt goes readily into solution and is uniformly distributed through the mixture. When the mixture is extruded and dried to an average moisture content of 9 to 11% and a content of 7% near the surface and 17% at the interior of the intermediate product, the limit of solubility of the salt with reference to water is exceeded at the surface and salt begins to crystallize out evenly on the surface of the intermediate product. More salt crystals form when the intermediate product is introduced into the hot fat, and, as more moisture is evaporated from the interior of the product, salt crystals are formed in progressive layers nearer and nearer to the center of the product thus possibly promoting better heat transfer and more uniform expansion of the product, so that completely uniform porosity of the product from the outside to the center is provided. Other salts which have been used satisfactorily are potassium chloride and potassium bromide. Some other salts can likewise be used as low molecular weight inorganic salts having univalent anions and univalent cations, which are preferable.

The above examples are illustrative only and are not to be construed as limiting the invention. In a similar manner other starch-containing flours, such as that derived from tapioca, rice, corn, etc., may be used. In like manner combinations of flour derived from various sources may be used. Other seasonings may also be used. Where cheese is used for flavoring normally about 4.8 parts of cheese is used for every 100 parts of potato flour. Various other modifications and changes may be made from the embodiments described herein within the principles of this invention and the scope of the appended claims.

I claim:

1. A process of producing an improved crispy, expanded foodstuff derived from starch-containing flours selected from the group consisting of potato, rice, tapioca and corn flour which comprises grinding said flour to produce a flour containing about 10% free starch, mixing said ground edible starch-containing flour, containing about 10% free starch with water and salt to produce an extrudable mass of starch-containing flour having a moisture content of 28 to 35%, extruding said mass under pressure equivalent to the rate of approximately 1 cm. per second when the extrusion orifice is 1 x 3.2 mm. to form coherent bands and produce a free starch content of about 30% near the outer surface of said bands, drying the coherent bands until they have a horn-like outer layer resistant to the penetration of moisture and heat and an average moisture content of 6 to 10% immersing said intermediate product in a hot, edible fat for a time sufficient to effect expansion and cooking of the dried coherent bands.

2. A process of producing an improved crispy, expanded foodstuff derived from starch-containing flours selected from the group consisting of potato, rice, tapioca and corn flour which comprises grinding said flour to produce a flour containing about 10% free starch mixing said ground edible starch-containing flour, containing about 10% free starch with water and salt to produce an extrudable mass of starch-containing flour having a salt content of 3.5 to 6% based on the weight of the dried intermediate product before frying and having a moisture content of 28 to 35%, extruding said mass under pressure equivalent to the rate of approximately 1 cm. per second when the extrusion orifice is 1 x 3.2 mm. to form coherent bands, and produce a free starch content of about 30% near the outer surface of said bands, drying the coherent bands until they have a horn-like outer layer resistant to the penetration of moisture and heat and containing salt crystals and an average moisture content of 6 to 10%, immersing said intermediate product in a hot, edible fat for a time sufficient to effect expansion and cooking of the dried coherent bands.

3. A process of producing an improved crispy, expanded foodstuff derived from starch-containing potato flour which comprises grinding said starch-containing potato flour to produce a flour which passes through a 40 mesh sieve, with at least 70% passing through a 50 mesh sieve, and at least 50% passing through a 70 mesh sieve, to produce a flour, containing about 10% of free starch, mixing said starch-containing potato flour, water, salt and seasoning materials to produce a plastic mass of starch-containing flour containing about 10% free starch and a moisture content of 28 to 35%, extruding said mass under pressure equivalent to the rate of approximately 1 cm. per second when the extrusion orifice is 1 x 3.2 mm. to produce about 30% free starch in the outer layers of the extrusion and form coherent bands, drying the coherent bands until they have an average moisture content of 6 to 10% and a horn-like outer layer resistant to the penetration of moisture and heat, immersing said dried product in a hot, edible fat for a time sufficient to effect expansion and cooking of the dried product whereby a crisp, expanded foodstuff is obtained.

4. A process of producing an improved crispy, expanded foodstuff derived from starch-containing potato flour which comprises grinding said starch-containing potato flour to produce a flour which passes through a 40 mesh sieve with at least 70% passing through a 50 mesh sieve and at least 50% passing through a 70 mesh sieve to produce a flour containing about 10% of free starch, mixing said starch-containing potato flour, water, salt and seasoning materials to produce a plastic mass of starch-containing flour containing about 10% free starch having a salt content of 3.5 to 6% based on the weight of the dried intermediate product before frying and a moisture content of 28 to 35%, extruding said mass under pressure equivalent to the rate of approximately 1 cm. per second when the extrusion orifices is 1 x 3.2 mm. to produce about 30% free starch in the outer layers of the extrusion and form coherent bands, drying the coherent bands until they have an average moisture content of 6 to 10% and a horn-like outer layer resistant to the penetration of moisture and heat and containing salt crystals, immersing said dried product in a hot, edible fat for a time sufficient to effect expansion and cooking of the dried product whereby a crisp, expanded foodstuff is obtained.

5. A process of producing a crispy, expanded foodstuff derived from starch-containing flour selected from the group consisting of potato, rice, tapioca and corn flour, which comprises grinding one batch of said starch-containing flour to produce about 10% free starch therein, grinding another batch of said flour to produce about 20% free starch therein, grinding another batch of said flour to produce about 30% free starch herein, mixing each of said batches with water so that the water content of the mix is between about 28 and about 35%, and with salt to form a dough, forming the dough from each batch into layers, assembling said layers into a sandwich with the layers containing 30% free starch on the outside, the layer containing 10% free starch on the inside and the layers containing 20% free starch between said 30% and said 10% free starch layers, cutting said sandwich into strands, drying the strands to a total water content of about 9 to 11% to produce a horn-like outer layer resistant to the penetration of moisture and heat, and frying said dried strands in a hot, edible fat for a time sufficient to effect expansion and cooking of the dried strands whereby a crisp expanded foodstuff is obtained.

6. A process of producing a crispy expanded foodstuff derived from starch-containing flour selected from the group consisting of potato, rice, tapioca and corn flour, which comprises grinding one batch of said starch-containing flour to produce about 10% free starch therein, grinding another batch of said flour to produce about 20% free starch therein, grinding another batch of said flour to produce about 30% free starch therein, mixing each of said batches with water so that the water content of the mix is between about 28 and about 35%, and with salt in the amount of about 3.5 to about 6% based on the weight of the dried strands before frying to form a dough, forming the dough from each batch into layers, assembling said layers into a sandwich with the layers containing 30% free starch on the outside, the layer containing 10% free starch on the inside and the layers containing 20% free starch between said 30% and said 10% free starch layers, cutting said sandwich into strands, drying the strands to a total water content of about 9 to 11% to produce a horn-like outer layer resistant to the penetration of moisture and heat and containing salt crystals, and frying said dried strands in a hot, edible fat for a time sufficient to effect expansion and cooking of the dried strands whereby a crisp expanded foodstuff is obtained.

7. A process of producing an intermediate for the production of a crispy expanded foodstuff derived from starch-containing flour selected from the group consisting of potato, rice, tapioca and corn flour, which comprises grinding one batch of said starch-containing flour to produce about 10% free starch therein, grinding another batch of said flour to produce about 20% free starch therein, grinding another batch of said flour to produce about 30% free starch therein, mixing each of said batches with water so that the water content of the mix is between about 28 and about 35%, and with salt to form a dough, forming the dough from each batch into layers, assembling said layers into a sandwich with the layers containing 30% free starch on the outside, the layers containing 10% free starch on the inside and the layers containing 20% free starch between said 30% and said 10% free starch layers, cutting said sandwich into strands and drying the strands to a total water content of about 9 to 11% to produce a horn-like outer layer resistant to the penetration of moisture and heat.

8. A process of producing an intermediate for the production of a crispy expanded foodstuff derived from starch-containing flour selected from the group consisting of potato, rice, tapioca and corn flour, which comprises grinding one batch of said starch-containing flour to produce about 10% free starch therein, grinding another batch of said flour to produce about 20% free starch therein, grinding another batch of said flour to produce about 30% free starch therein, mixing each of said batches with water so that the water content of the mix is between about 28 and about 35%, and with salt in the amount of about 3.5 to about 6% based on the weight of the dried strands before frying to form a dough, forming the dough from each batch into layers, assembling said layers into a sandwich with the layers containing 30% free starch on the outside, the layers containing 10% free starch on the inside and the layers containing 20% free starch between said 30% and said 10% free starch layers, cutting said sandwich into strands, and drying the strands to a total water content of about 9 to 11% to produce a horn-like outer layer resistant to the penetration of moisture and heat and containing salt crystals and frying said dried strands in a hot, edible fat for a time sufficient to effect expansion and cooking of the dried strands whereby a crisp expanded foodstuff is obtained.

9. A process of producing an intermediate for an improved, crispy, expanded foodstuff derived from starch-containing flours selected from the group consisting of potato, rice, tapioca and corn flour which comprises grinding said flour to produce a flour containing about 10% free starch, mixing said ground edible starch-containing flour, containing about 10% free starch with water and salt to produce an extrudable mass of starch-containing flour having a moisture content of 28 to 35%, extending said mass under pressure equivalent to the rate of approximately one centimeter per second when the extrusion orifice is 1 x 3.2 mm., to form coherent bands and produce a free starch content of about 30% near the outer surface of said bands, and drying the coherent bands until they have a horn-like outer layer resistant to the penetration of moisture and heat and an average moisture content of 6 to 10%.

10. A process of producing an intermediate for an improved crispy, expanded foodstuff derived from starch-containing potato flour which comprises grinding said starch-containing potato flour to produce a flour which passes through a 40-mesh sieve, with at least 70% passing through a 50-mesh sieve, and at least 50% passing through a 70-mesh sieve, to produce a flour, containing about 10% of free starch, mixing said starch-containing potato flour, water, salt and seasoning materials to produce a plastic mass of starch-containing flour containing about 10% free starch and a moisture content of 28 to 35%, extruding said mass under pressure equivalent to the rate of approximately one centimeter per second when the extrusion orifice is 1 x 3.2 mm., to produce about 30% free starch in the outer layers of the extrusion and form coherent bands and drying the coherent bands until they have an average moisture content of 6 to 10% and a horn-like outer layer resistant to the penetration of moisture and heat.

References Cited by the Examiner

UNITED STATES PATENTS 2,863,770 12/1958 Spieser _____ 99—100 X
3,076,711 2/1963 Gerkens _____ 99—100

FOREIGN PATENTS 204,381 11/1956 Australia.

A. LOUIS MONACELL, *Primary Examiner.*